United States Patent
Mailaender et al.

(10) Patent No.: US 7,167,507 B2
(45) Date of Patent: Jan. 23, 2007

(54) EQUALIZER AND METHOD FOR PERFORMING EQUALIZATION IN A WIRELESS COMMUNICATIONS SYSTEM

(75) Inventors: Laurence Eugene Mailaender, New York, NY (US); Sivarama Krishnan Venkatesan, Secaucus, NJ (US); Graeme Kenneth Woodward, Eastwood (AU)

(73) Assignee: Lucent Technologies Inc., Murray Hill, NJ (US)

( * ) Notice: Subject to any disclaimer, the term of this patent is extended or adjusted under 35 U.S.C. 154(b) by 673 days.

(21) Appl. No.: 10/185,747

(22) Filed: Jul. 1, 2002

(65) Prior Publication Data

US 2004/0001426 A1    Jan. 1, 2004

(51) Int. Cl.
    *H04K 1/00*    (2006.01)
(52) U.S. Cl. .................. 375/148; 375/347; 375/229
(58) Field of Classification Search ............... 375/347, 375/147, 148, 150, 316, 343, 229
    See application file for complete search history.

(56) References Cited

U.S. PATENT DOCUMENTS

| | | | |
|---|---|---|---|
| 5,692,010 A | * | 11/1997 | Nielsen ................. 375/232 |
| 6,847,658 B1 | * | 1/2005 | Ling et al. ............. 370/536 |
| 2002/0060999 A1 | * | 5/2002 | Ma et al. ............... 370/335 |
| 2003/0072255 A1 | * | 4/2003 | Ma et al. ............... 370/208 |
| 2003/0076908 A1 | * | 4/2003 | Huang et al. ........... 375/350 |
| 2003/0091022 A1 | * | 5/2003 | Blanz et al. ............ 370/350 |

* cited by examiner

Primary Examiner—Temesghen Ghebretinsae

(57) ABSTRACT

A receiver, system, and method for performing equalization. The receiver includes a multi-channel chip equalizer for receiving a plurality of receive baseband signals and restoring chip pulse shapes of a plurality of transmit baseband signals transmitted by a plurality of transmit antenna to produce a plurality of equalized output streams and a correlator for correlating the plurality of equalized output streams with a correlation signal to reduce gradient noise in the plurality of equalized output streams. The method of equalizing includes receiving a plurality of receive baseband signals and restoring chip pulse shapes of a plurality of transmit baseband signals transmitted by a plurality of transmit antenna to produce a plurality of equalized output streams and correlating the plurality of equalized output streams with a correlation signal to reduce gradient noise in the plurality of equalized output streams.

21 Claims, 7 Drawing Sheets

EQUALIZER AND METHOD FOR PERFORMING EQUALIZATION IN A WIRELESS COMMUNICATIONS SYSTEM

BACKGROUND OF THE INVENTION

1. Field of the Invention

This invention relates to wireless communications and, more particularly, to multipath processing for a wireless communications.

2. Description of Related Art

Traditional Code Division Multiple Access (CDMA) receivers depend on a spreading code design to mitigate the effects of multipath channels. Spreading sequences with good auto-correlation properties allow a RAKE receiver to detect and process individual multipaths before the individual multipaths are combined. In practice, ideal spreading codes are difficult to design. Further, as data rates and capacity demands increase for subsequent generation systems, simple RAKE-based detection will no longer be adequate.

Data rates of up to approximately 20 Mbps have been proposed for the High Speed Downlink Packet Access (HSDPA) mode of the Universal Mobile Telecommunications System (UMTS) third generation (3G) standard, using multiple antennae at the transmitter and receiver in up to a 4×4 configuration. With a chip rate of 3.84 Mcps, the spectral efficiency proposed is on the order of 5 bps/Hz, higher than conventional systems, but realizable for multiple antennae systems. Furthermore, with turbo codes used for channel coding, 3G systems may be capable of operating with high load, and hence, a modest signal to noise ratio ($I_{or}/I_{oc}$) budget (<10 dB).

With low signal levels and interference from other users, other transmit antennae, and multipaths, the initial detection and despreading phase are factors in overall performance. The 3G spreading codes are designed for orthogonality between users, or between multiple antenna of a given user at a basestation transmitter. These spreading codes do not have particularly good auto-correlation properties. As a result, much of the interference at the receiver is due to multipaths from the same transmit stream.

Equalizers have been designed to restore the chip pulse shape to re-orthogonalize the transmit signals, and combine multipath components of the one transmit stream in order to reduce total mean squared error (MSE). However, such structures have been described for single antenna configurations only.

SUMMARY OF THE INVENTION

The present invention is directed to a receiver, system, and method for performing equalization. The present invention applies equalization to multi-in-multi-out (MIMO) channels and furthermore utilizes a correlator to reduce adaptation noise.

In one exemplary embodiment, the present invention is directed to a receiver, including a multi-channel chip equalizer for receiving a plurality of receive baseband signals and restoring chip pulse shapes of a plurality of transmit baseband signals transmitted by a plurality of transmit antenna to produce a plurality of equalized output streams and a correlator for correlating the plurality of equalized output streams with a correlation signal to reduce gradient noise in the plurality of equalized output streams. The receiver may also include a plurality of receive antenna for receiving the plurality of receive baseband signals. The receiver may also include a plurality of downconverters and matched filters for downconverting and matched filtering outputs from the plurality of receive antenna. A number of the plurality of transmit antenna may be different from a number of the plurality of receive antenna.

The multi-channel chip equalizer may restore the chip pulse shape of the plurality of transmit baseband signals using an adaptive algorithm. The adaptive algorithm updates tap settings of said multi-channel chip equalizer based on a plurality of correlated output streams from said correlator.

The correlator correlates the plurality of equalized output streams with at least one pilot signal. The pilot signal may be the CPICH signal.

The receiver may also include a despreader for despreading the plurality of equalized output streams from the multi-channel chip equalizer with a plurality of spreading sequences. The receiver may also include a processor implementing a detection algorithm for performing a detection operation on a plurality of despread signals out put by the despreader. The detection algorithm may a Bell Labs Layered Space-Time system (BLAST) algorithm.

The receiver may be part of a base station or a mobile terminal. The receiver may also be part of a system, which further includes a transmitter, where the transmitter includes a demultiplexer for demultiplexing an original transmit stream into a plurality of original transmit sub-streams, a plurality of spreader/scramblers for applying a spreading code and a scrambling code to each of the plurality of original transmit sub-streams, a plurality of pulse shapers/upconverters for shaping and upconverting outputs from the plurality of spreader/scramblers, and the plurality of transmit antenna for transmitting outputs from the plurality of pulse shapers/upconverters as the plurality of transmit baseband signals. The system may be a multi-in, multi-out (MIMO) system.

In another exemplary embodiment, the present invention is directed to a method of equalizing a signal including receiving a plurality of receive baseband signals and restoring chip pulse shapes of a plurality of transmit baseband signals transmitted by a plurality of transmit antenna to produce a plurality of equalized output streams and correlating the plurality of equalized output streams with a correlation signal to reduce gradient noise in the plurality of equalized output streams. The method may also include downconverting and matched filtering outputs from a plurality of receive antenna. A number of the plurality of transmit antenna may be different from a number of the plurality of receive antenna.

Further, restoring the chip pulse shape of the plurality of transmit baseband signals includes using an adaptive algorithm. Still further, the adaptive algorithm updates tap settings of a multi-channel chip equalizer based on a plurality of correlated output streams.

The method may also include demultiplexing an original transmit stream into a plurality of original transmit sub-streams, applying a spreading code and a scrambling code to each of the plurality of original transmit sub-streams, shaping and upconverting outputs from the plurality of spreader/scramblers, and transmitting the shaped and converted outputs as the plurality of transmit baseband signals. The method may also include despreading the plurality of equalized output streams with a plurality of spreading sequences and/or implementing a detection algorithm for performing a detection operation on a plurality of despread signals. The detection algorithm may be a Bell Labs Layered Space-Time system (BLAST) algorithm.

BRIEF DESCRIPTION OF THE DRAWINGS

Other aspects and advantages of the present invention may become apparent upon reading the following detailed description and upon reference to the drawings in which.

DETAILED DESCRIPTION

The mathematical theory behind the various embodiments of the present invention will be discussed first, followed by exemplary implementation of the mathematical theory. The HSDPA mode of UMTS demultiplexes a high data rate stream to multiple streams at each of multiple transmit antenna. Each stream is assigned a different spreading sequence, and each transmit antenna uses a unique scrambling code. It is assumed that each data stream is transmitted with the same power. Furthermore a unique common pilot channel (CPICH) code is added at each transmitter. Thus, the base and signal transmitted from antenna m, m $\epsilon\{0, \ldots, M-1\}$, may be represented by $$x_m(i) = \sum_{k=o}^{K-1} x_{m,k}(i) + A_p d_m(i) \quad (1)$$

where K spreading codes are used, $x_k(i)$ is a chip sequence (after spreading and scrambling), $A_p$, is the relative pilot amplitude and $d(i)=[d_o(i) \ldots d_{M-1}(i)]$ are the scrambled pilots at time i.

Figure 1:
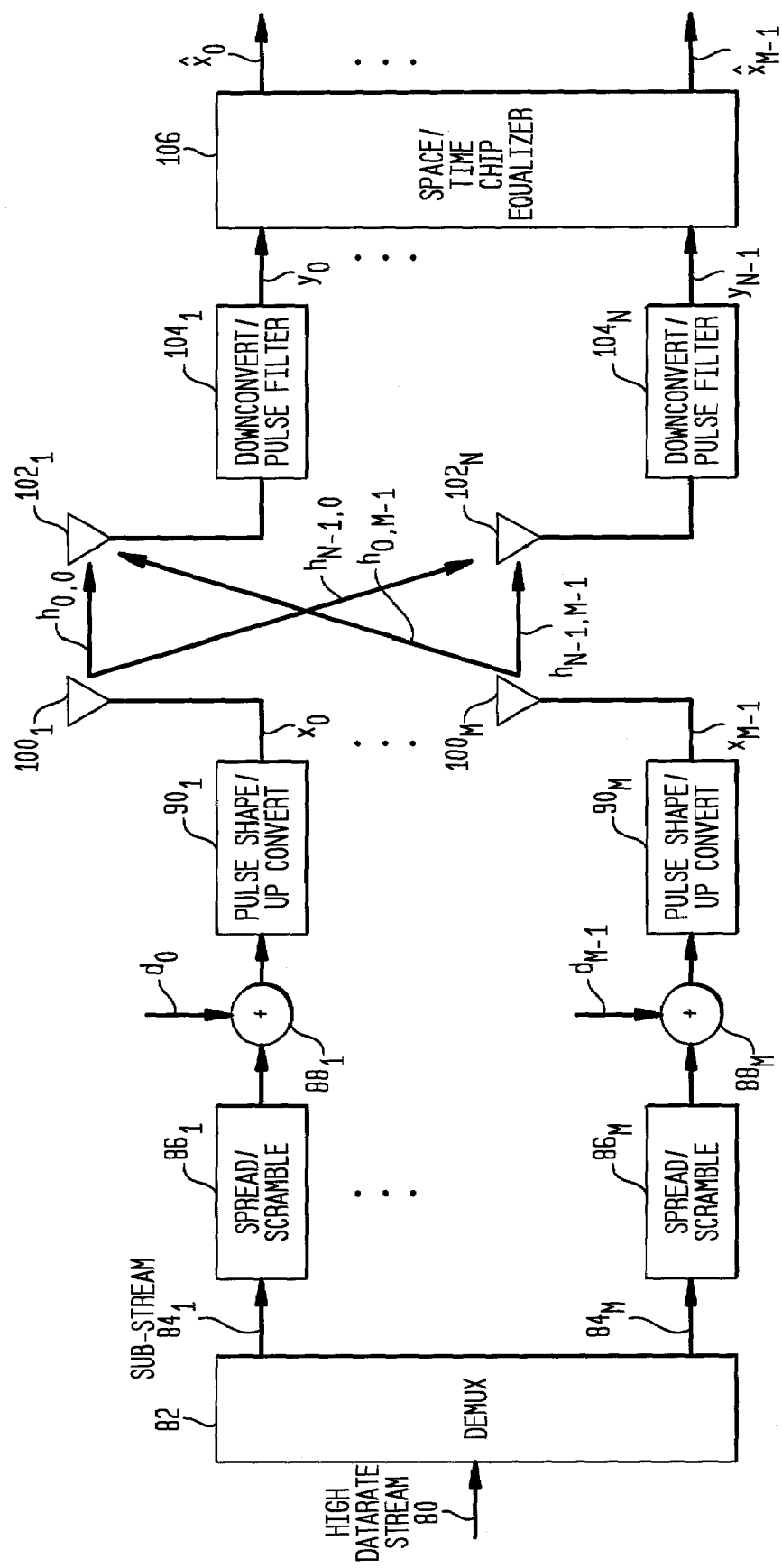
FIG. 1 illustrates the Universal Mobile Telecommunication System (UMTS) operating in the High Speed Downlink Packet Access (HSDPA) mode in accordance with one exemplary embodiment of the present invention.

FIG. 1 illustrates the UMTS operating in the HSDPA mode in accordance with one exemplary embodiment of the present invention. A high data rate stream 80 is fed to a demultiplexer 82, which divides the high data rate stream 80 into M substreams $84_1 \ldots _M$. A spreading code and a scrambling code are applied to each substream $84_1 \ldots _M$ by spread/scramble circuit $86_1 \ldots _M$. An output of each of the spread/scramble circuits $86_1 \ldots _M$ is summed with one of M pilots $d_0 \ldots _{M-1}$ in summers $88_1 \ldots _M$. The output of each summer $88_1 \ldots _M$ is fed to a pulse shaped/up convert circuit $90_1 \ldots _M$. M transmitters $100_1 \ldots _M$ send signals $x_m(i)$ to N receive antenna $100_1 \ldots _N$. After down-conversion and chip matched filtering by downconverter/pulse filter $104_1 \ldots _N$, baseband received signals are represented by $y_n(i)$, where n $\epsilon\{0, \ldots, N-1\}$ and i is the time index. $y_n(i)$ is a P-vector where P is the number of samples per chip interval.

Arranging transmit and received samples into supervectors over a finite observation window of E chip intervals at the receiver allows the received samples to be compactly represented in the form $$y(i)=\Gamma x(i)+n(i) \quad (2)$$

where matrix $\Gamma$ describes the space-time channel and x(i) contains all transmit symbols influencing the received signal during the window represented in y(i). The function of the space-time chip equalizer 106 is to estimate the samples as transmitted at time offset d, i.e. the desired signal is given by $x_d(i) \underline{\Delta} [x_o(i+d) \ldots x_{M-1}(i+d)]^T$. Thus, the finite length minimum MSE (MMSE) filter coefficients are given by $$W_{MMSE}=E[y(i)y(i)^H]^{-1}E[y(i)x_d(i)^H] \quad (3)$$

$$= \left[\Gamma\Gamma^H + \frac{\sigma_n^2}{\sigma_x^2}R_p\right]^{-1}\Gamma E_d \sigma_x^2 \quad (4)$$

where $E_d=[0 \ldots I \ldots 0]^T$ determines the synchronization. The M×M zero matrix is written 0 and I is the identity matrix at block offset d. The variance of the noise and the transmitted samples are given by $\sigma_n^2$ and $\sigma_x^2$ respectively, with the noise covariance matrix after pulse shaping $R_p$. The MMSE estimate of the transmitted samples is written $$\hat{x}(\hat{t})=W_{MMSE}^H y(i) \quad (5)$$

In practice, estimating all channel coefficients and performing the matrix inversion in Eq. (4) is computationally prohibitive. Instead, a gradient adaptive approach can utilize a continuous signal, such as the continuous CPICH signal transmitted from each transmit antenna $100_1 \ldots _M$. Equalizer coefficients may evolve by taking steps in the direction of negative estimated gradient on the error performance surface.

$$W_{LMS}(i+1)=W_{LMS}(i)-\mu\nabla_w E[diag\{e(i)e(i)^H\}] \quad (6)$$

where $$e(i)\underline{\Delta}\begin{bmatrix}e_o(i)\\ \vdots \\ e_{M-1}(i)\end{bmatrix} = \hat{x}(i)-x_d(i) \quad (7)$$

For the least mean squares (LMS) algorithm, an instantaneous estimate of the gradient expectation is used in (6). Given (1) and assuming random independent data and pilots, the coefficients in the expectation become $$E[|\acute{e}_m(i)|^2]$$

where $\acute{e}_m(i)=\hat{x}_m(\hat{t})-d_m(i)$. That is, the pilots are used in forming the gradient estimate and the random data symbols contribute to the gradient noise. Normalizing the step size gives the normalized LMS (NLMS) update equation $$W_{NLMS}(i+1) = W_{NLMS}(i) + \mu \frac{y(i)\tilde{e}(i)^H}{\|y(i)\|^2} \quad (8)$$

with $0<\tilde{\mu}<1$ used to control the speed of convergence and excess MSE.

Multiple input multiple output (MIMO) processing employs multiple antennas at both the base station transmitter and terminal receiver, providing several advantages over transmit diversity techniques with multiple antennas only at the transmitter and over conventional signal antenna systems. FIG. 1 is an example of a MIMO system. If multiple antennas are available at both the transmitter and receiver, the peak throughput can be increased using a technique known as code re-use. With code re-use, each channelization/scrambling code pair allocated for HS-DSCH transmission can modulate up to M distinct data streams, where M is the number of transmit antennas. Data streams which share the same channelization/scrambling code must be distinguished based on their spatial characteristics, requiring a receiver with at least M antennas. In principle, the peak throughput with code re-use is M times the rate achievable with a single transmit antenna. Further, with code re-use, some intermediate data rates can be achieved with a combination of code re-use and smaller modulation constellations, e.g. 16 QAM (Quadrate Amplitude Modulation) instead of 64 QAM. Compared to the single antenna transmission scheme with a larger modulation constellation to achieve the same rate, the code re-use technique may have a smaller required Eb/No. resulting in overall improved system performance.

Figure 2:
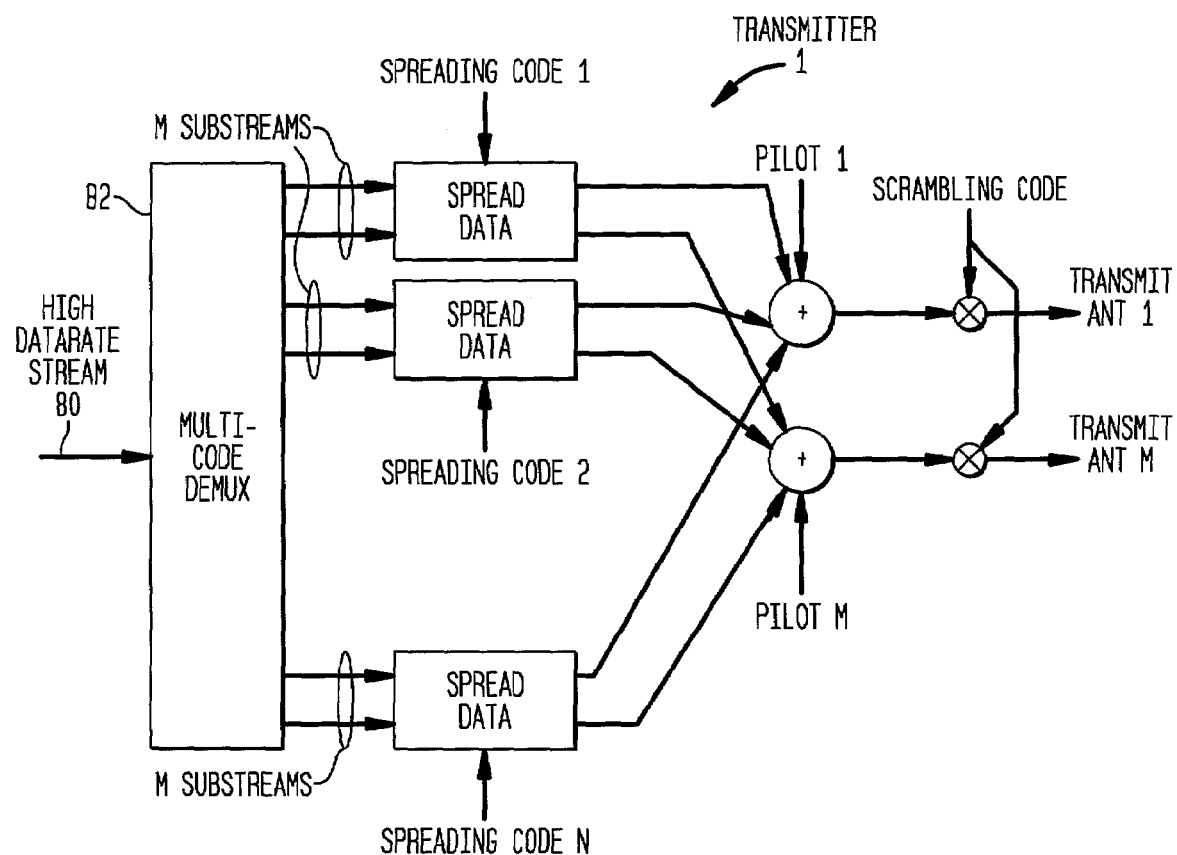
FIG. 2 illustrates the demultiplexing, spreading and scrambling operations in one exemplary embodiment of the present invention.

With conventional single antenna transmitters, a high data rate source is demultiplexed into K lower rate substreams, and the kth substream (k=1 . . . K) is spread with spreading code k (where the spreading codes indexed by k=1 . . . K are mutually orthogonal). These substreams are summed together, scrambled and transmitted. A multiple antenna transmitter 1 with M antenna is shown in FIG. 2. FIG. 2 represents a typical transmitter for the MIMO antenna processing technique. The high data rate source is demultiplexed into MN substreams, and the nth group (n1 . . . N) of M substreams is spread by the nth spreading code. The mth substream (m=1 . . . M) of this group is transmitted over the mth antenna so that the substreams sharing the same code are transmitted over different antennas. These M substreams sharing the same code can be distinguished based on their spatial characteristics at the receiver using multiple antennas and spatial signal processing. Typically, the receiver must have at least M antennas to detect the signals sufficiently well; however, it is possible to perform detection using fewer than M antennas if more sophisticated detection algorithms are used.

Figure 3:
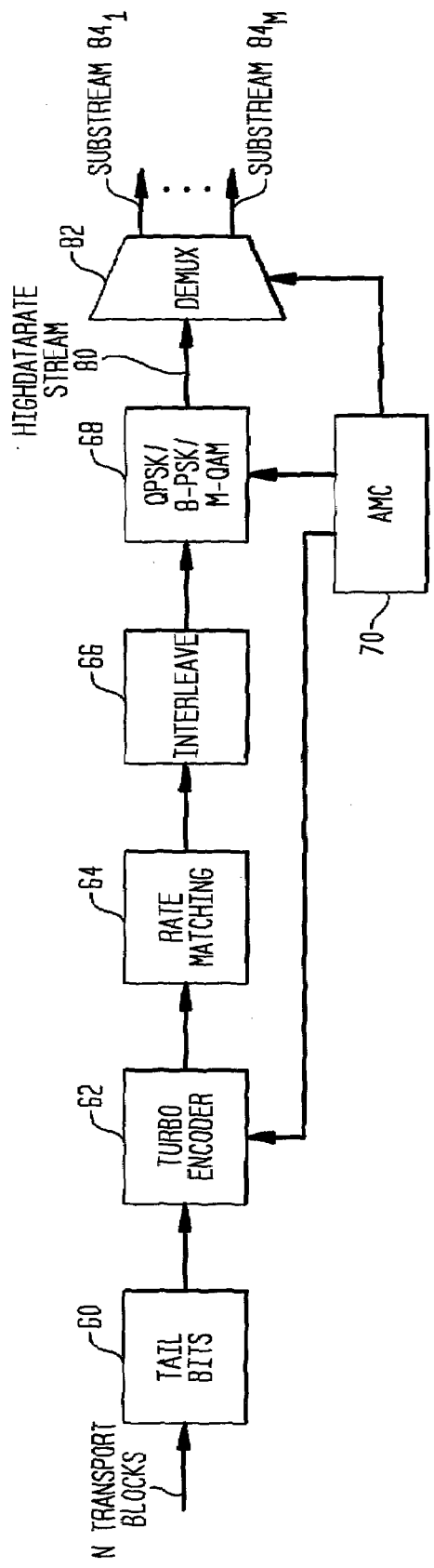
FIG. 3 illustrates processing prior to the demultiplexer of FIGS. 1 and 2, in one exemplary embodiment of the present invention.

The processing prior to demultiplexer 82 is shown in more detail in FIG. 3. In particular, as illustrated in FIG. 3, N transport blocks are processed to produce the high data rate stream 80 which is fed to the demultiplexer 82. In particular, the N transport blocks are subject to tail bit processing 60, turbo encoding 62, rate matching 64, interleaving 66, and QPSK/8-PSK/M-QAM 68. As illustrated, FIG. 3 also implements adaptive modulation and coding (AMC) 70.

AMC 70 is sensitive to measurement error and delay. In order to select the appropriate modulation, a scheduler should be aware of the channel quality. Errors in the channel estimate will cause the scheduler to select the wrong data rate and either transmit at too high a power, wasting system capacity, or too low a power, raising the block error rate. Delay in reporting channel measurements also reduces the reliability of the channel quality estimate due to the constantly varying mobile channel. Furthermore changes in the interference add to the measurement errors. Hybrid ARQ (HARQ) enables the implementation of AMC 70 by reducing the number of required MCS levels and the sensitivity to measurement error and traffic fluctuations.

Figure 4:
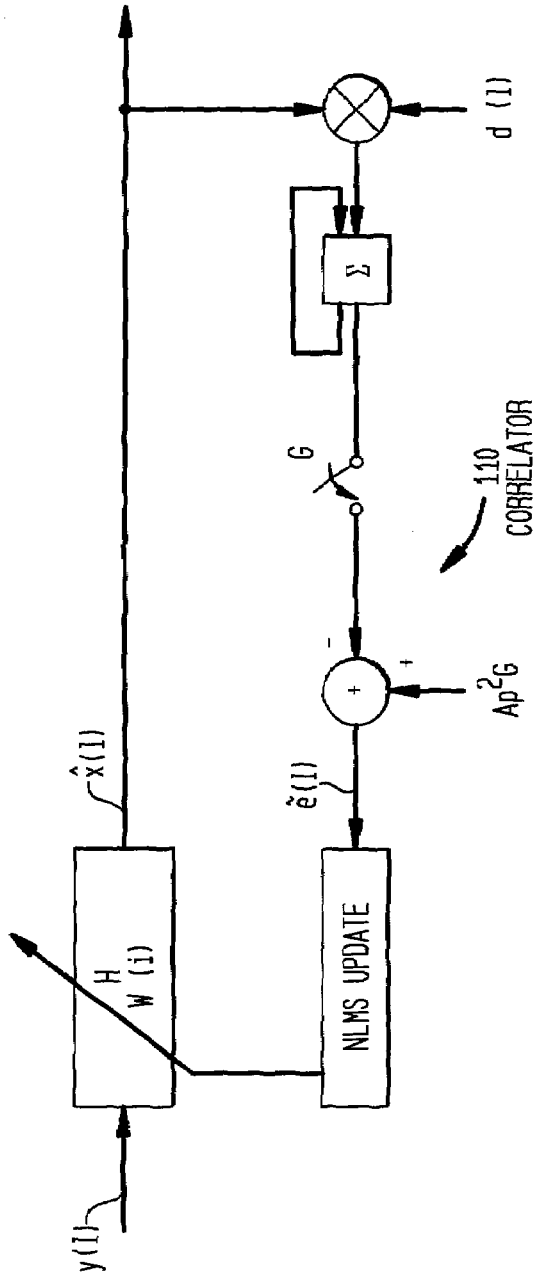
FIG. 4 illustrates a receiver incorporating a correlator on filter output, in one exemplary embodiment of the present invention.

To reduce the gradient noise, the output of the filtering operation may be correlated with the pilot sequence over an appropriate windowing period, G chip intervals. The receiver correlator structure is shown in FIG. 4. The correlator 110 uses the conjugates of the known pilot sequences, and thus the reference signal is a scalar constant for each transmitted stream. The error $\tilde{e}(i)$ is found by taking the difference between the correlator output and this reference value.

The resulting normalized update algorithm may be written $$W_{NLMSG}(i+1) = W_{NLMSG}(i) + \tilde{\mu}\frac{Y(i)D^H(i)\text{diag}\{\tilde{e}*(i)\}}{A_p^2 G \sigma_d^2 \|y(i)\|^2} \quad (9)$$

where a simplification has been used on the denominator to allow the same step size to be used for each antenna, thus saving computation. It is noted that both the simplification and the more complete relationship could be used. The numerator term $Y(i)D^H(i)$ represents the correlation operation with $$Y(i) \triangleq [y(i) \ldots y(i-G+1)] \quad (10)$$

representing the input history over G chips, and $$D(i) \triangleq \begin{bmatrix} d_0(i) & \ldots & d_0(i+G-1) \\ \vdots & & \vdots \\ d_{M-1}(i) & \ldots & d_{M-1}(i+G-1) \end{bmatrix} \quad (11)$$

representing the appropriate pilot symbols.

While it is computationally more efficient to apply the correlator 110 at the output of the equalizer 106, equivalently, a transform may be applied directly to the signal. The transform in this case is antenna dependent and time varying.

The addition of the correlator 110 allows the equalizer 106 to converge more rapidly and accurately.

Figure 5:
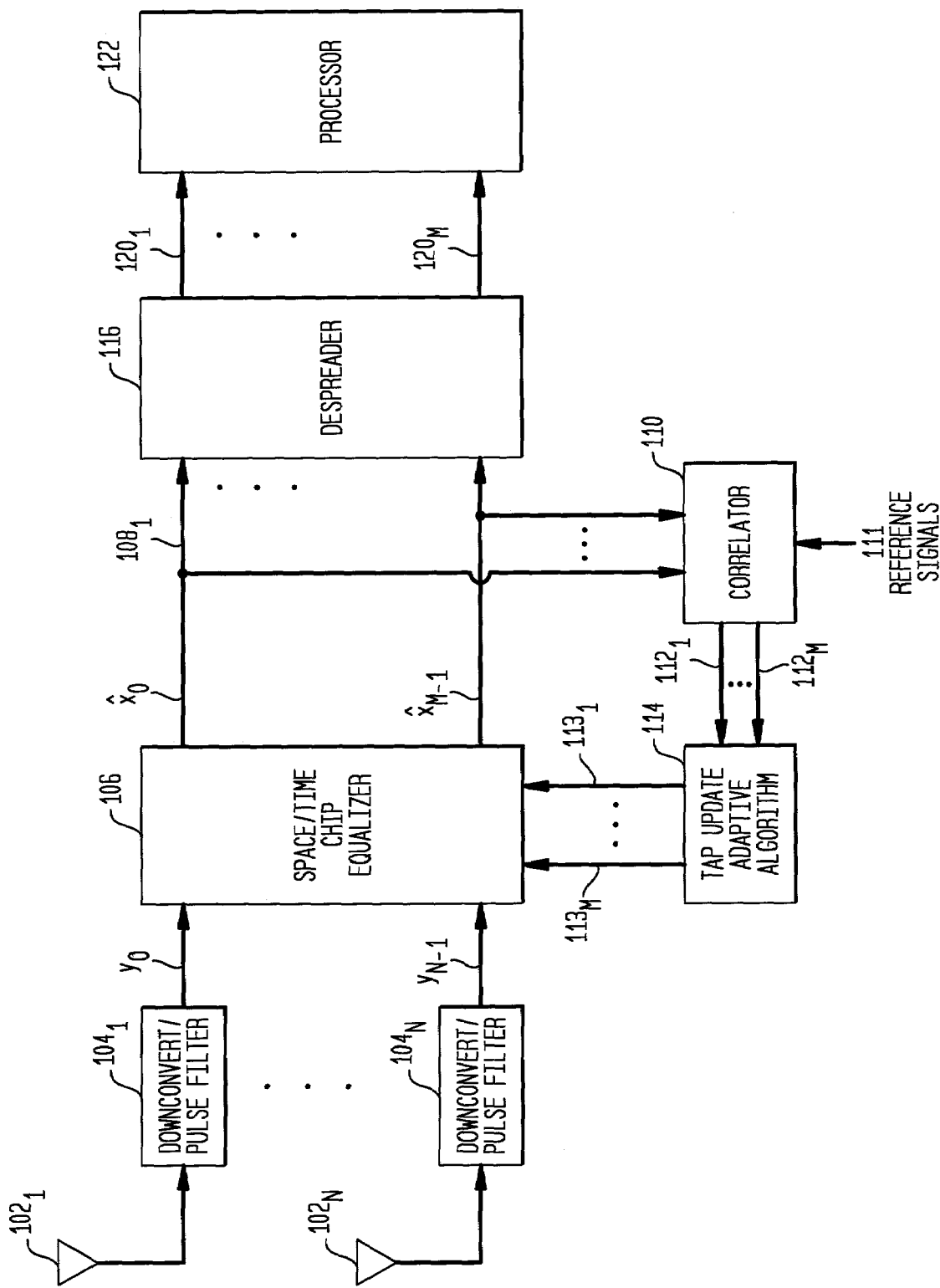
FIG. 5 illustrates the equalizer and correlator in one exemplary embodiment in more detail.

FIG. 5 illustrates the equalizer 106 and the correlator 110 in more detail. In particular, the M equalized streams $108_{1 \ldots M}$ are input to the correlator 110. The correlator 110 also receives correlation signals 111, for example, CPICH signals and forwards M correlated signals $112_{1 \ldots M}$ to a tap updating adaptive algorithm 114. The reference signals 111 would typically be generated locally, e.g. a pseudo-random bit sequence generated by a feedback shift register. Alternatively, the reference signals could be transmitted and received across the channel. The tap updating adaptive algorithm 114 processes the outputs $112_{1 \ldots M}$ of correlator 110, computes a gradient estimate, and computes new tap settings $113_{1 \ldots M}$ for a filtering section of the equalizer 106. Further, the M equalized streams $108_{1 \ldots M}$ from the equalizer 106 are despread in despreader 116. Despreading is similar to correlation, however, spreading sequences 118 are utilized (instead of pilot signals, such as the CPICH signals) and the rates may be different. Signals $120_{1 \ldots M}$ output from the despreader 116 are subject to detection by a processor 122. The processor 122 runs a detection algorithm, for example a Bell Labs Layered Space-Time System (BLAST) algorithm.

Figure 6A:
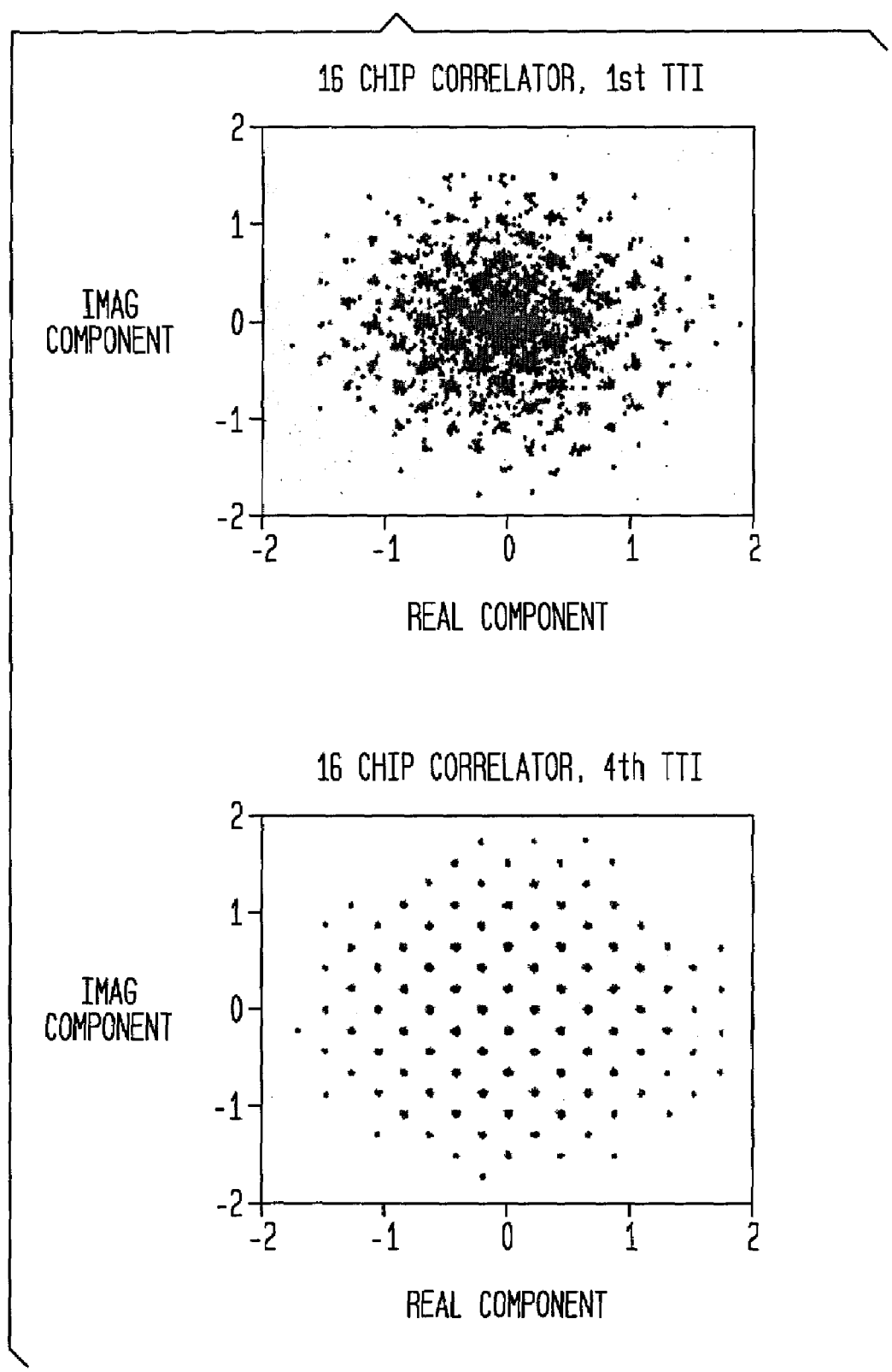
FIG. 6A illustrates an equalizer output constellation for an exemplary antenna in a system with the correlator of FIG. 4.
Figure 6B:
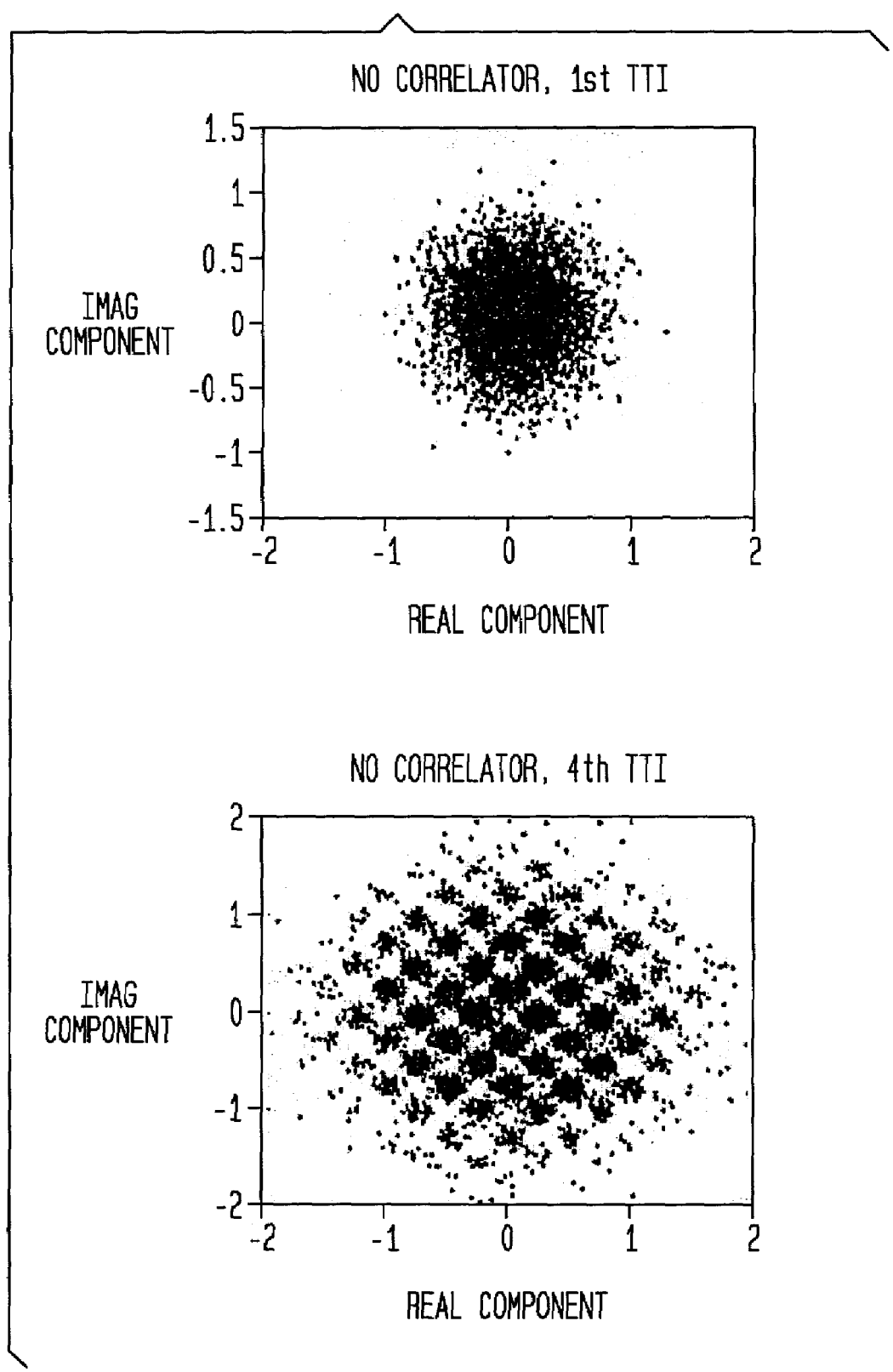
FIG. 6B illustrates the equalizer output constellation for an exemplary antenna in a system without the correlator of FIG. 4.

FIGS. 6A and 6B illustrate the equalizer output constellation corresponding to one antenna in a system operating over a 2×2 MIMO channel with Pedestrian-A impulse responses on each link, 10 codes on each transmit antenna, QPSK modulated with 10% pilot power (9.6 Mbps, uncoded). The equalizer was trained from the all zero state over 4 transmission timing intervals (TTIs), of 3 slots each (i.e. a TTI is 7680 chips). Scatter graphs are shown on the top line for the first TTI and on the lower line for the 4th TTI. FIG. 6A shows performance when a 16 chip correlator is used, FIG. 6B without, each using identical received data. The step sizes of the equalizers have been selected empirically to achieve the lowest mean square error over the first TTI. Larger step sizes are possible when the correlator is included, due to the reduced adaptation noise.

Figure 7:
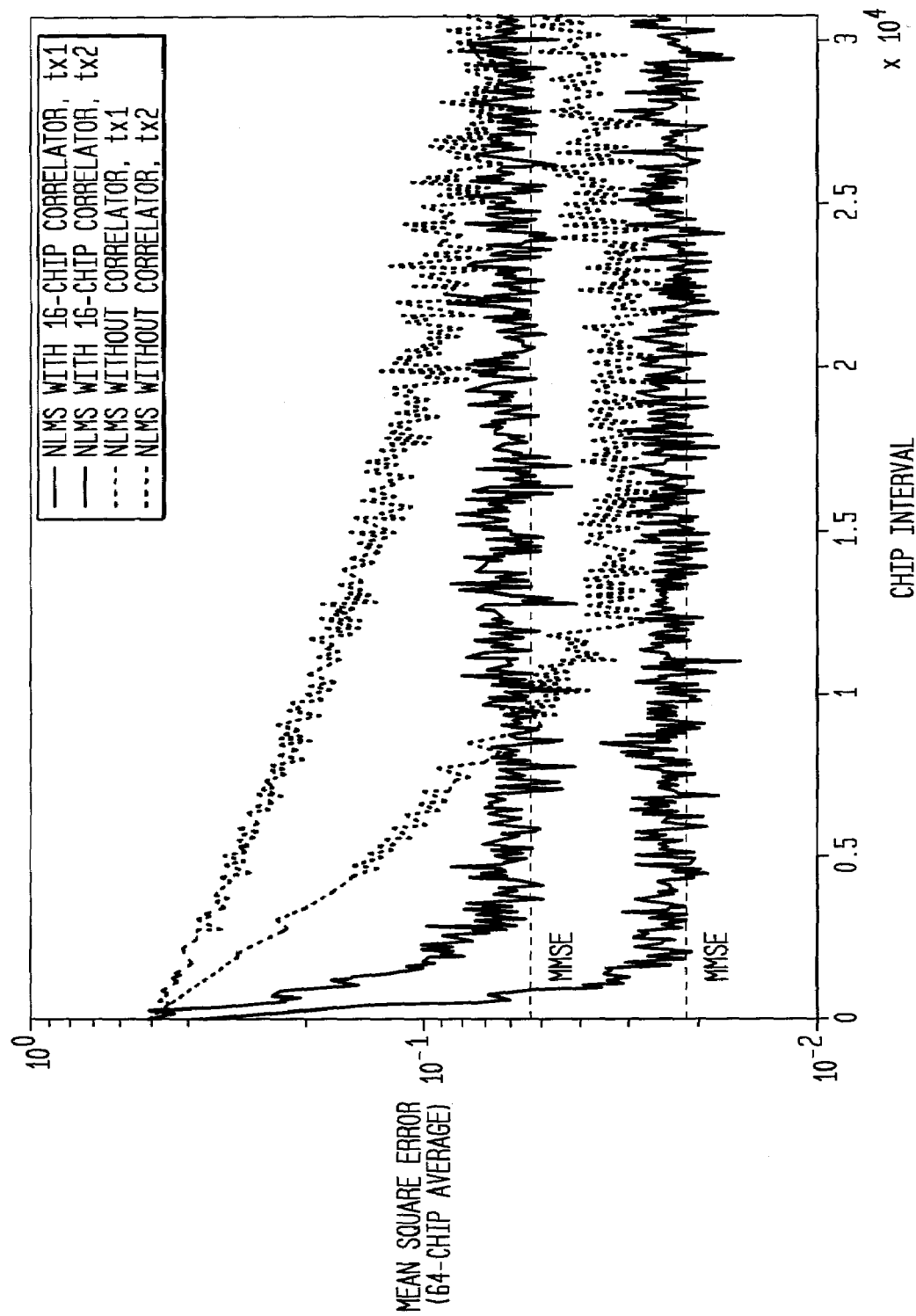
FIG. 7 illustrates a comparison of equalizer convergence, with and without the correlator of FIG. 4.

FIG. 7 shows a trace of MSE over time for the two structures corresponding to FIGS. 6A and 6B. Simulation parameters were identical, except that $I_{or}/I_{oc}$ was reduced to approximately 10 dB. From FIG. 7, it is clear that inclusion of the correlator 110 allows both much more rapid and complete convergence. The observed excess MSE is small when the equalizer 106 is used, as the correlator is effective at suppressing gradient noise—when the equalizer approaches the vertex of the error performance surface, the gradient estimates remain near zero, so there is very little ongoing adaptation of the coefficients.

Still further, although the features of the present invention have been described above in the context of a method, these features are also applicable to apparatus, system, and software applications, and embodying the teachings of the present application in an apparatus, system, or software would be achievable by one of ordinary skill in the art.

What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

We claim:

1. A receiver, comprising:
   a multi-channel chip equalizer for receiving a plurality of receive baseband signals and restoring chip pulse shapes of a plurality of transmit baseband signals transmitted by a plurality of transmit antenna to produce a plurality of equalized output streams;
   a correlator for correlating the plurality of equalized output streams with a correlation signal, and generating a plurality of correlated output streams to be fed back to the multi-channel chip equalizer; and
   a despreader for despreading the plurality of equalized output streams from said multi-channel chip equalizer with a plurality of spreading sequences.

2. The receiver of claim 1, wherein said correlator reduces gradient noise in the plurality of equalized output streams.

3. The receiver of claim 1, further comprising:
   a plurality of receive antenna for receiving the plurality of receive baseband signals.

4. The receiver of claim 1, said multi-channel chip equalizer restoring the chip pulse shape of the plurality of transmit baseband signals using an adaptive algorithm.

5. The receiver of claim 4, wherein the adaptive algorithm updates tap settings of said multi-channel chip equalizer based on a plurality of correlated output streams from said correlator.

6. The receiver of claim 4, wherein the correlation signal includes at least one pilot signal.

7. The receiver of claim 6, wherein the at least one pilot signal is a CPICH signal.

8. A base station including the receiver of claim 1.

9. A mobile terminal including the receiver of claim 1.

10. A base station controller including the receiver of claim 1.

11. A system including the receiver of claim 1, said system further including a transmitter, said transmitter comprising:
    a demultiplexer for demultiplexing an original transmit stream into a plurality of original transmit sub-streams,
    a plurality of spreader/scramblers for applying a spreading code and a scrambling code to each of the plurality of original transmit sub-streams,
    a plurality of pulse shapers/upconverters for shaping and upconverting outputs from the plurality of spreader/scramblers, and
    the plurality of transmit antenna for transmitting outputs from the plurality of pulse shapers/upconverters as the plurality of transmit baseband signals.

12. The system of claim 11, wherein said system is a multi-in, multi-out (MIMO) system.

13. The receiver of claim 1, further comprising a processor implementing a detection algorithm for performing a detection operation on a plurality of despread signals output by said despreader.

14. The receiver of claim 13, wherein a number of the plurality of transmit antenna is different from a number of the plurality of receive antenna.

15. A method of equalizing a signal, comprising:
    receiving a plurality of receive baseband signals and a plurality of correlated output streams, and restoring chip pulse shapes of a plurality of transmit baseband signals transmitted by a plurality of transmit antenna to produce a plurality of equalized output streams;
    correlating the plurality of equalized output streams with a correlation signal, and outputting the plurality of correlated output streams, and
    despreading the plurality of equalized output streams with a plurality of spreading sequences.

16. The method of claim 15, where said correlating reduces gradient noise in the plurality of equalized output streams.

17. The method of claim 15, wherein said restoring the chip pulse shape of the plurality of transmit baseband signals includes using an adaptive algorithm.

18. The method of claim 17, wherein the adaptive algorithm updates tap settings of a multi-channel chip equalizer based on a plurality of correlated output streams.

19. The method of claim 15, further comprising:
    demultiplexing an original transmit stream into a plurality of original transmit sub-streams,
    applying a spreading code and a scrambling code to each of the plurality of original transmit sub-streams,
    shaping and upconverting outputs from the plurality of spreader/scramblers, and
    transmitting the shaped and converted outputs as the plurality of transmit baseband signals.

20. The method of claim 15, further comprising:
    implementing a detection algorithm for performing a detection operation on a plurality of despread signals.

21. A receiver, comprising:
    a multi-channel chip equalizer for receiving a plurality of receive baseband signals and restoring chip pulse shapes of a plurality of transmit baseband signals using an adaptive algorithm, the plurality of transmit baseband signals transmitted by a plurality of transmit antennas to produce a plurality of equalized output streams; and a correlator for correlating the plurality of equalized output streams with a correlation signal, which includes at least one pilot signal, and the correlator generating a plurality of correlated output streams to be fed back to the multi-channel chip equalizer.

* * * * *